United States Patent

Ikeda

[11] Patent Number: 6,157,440
[45] Date of Patent: *Dec. 5, 2000

[54] IMAGE INPUT APPARATUS

[75] Inventor: Osamu Ikeda, Yokohama, Japan

[73] Assignee: Nikon Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/604,701

[22] Filed: Feb. 21, 1996

[30] Foreign Application Priority Data

| Feb. 24, 1995 | [JP] | Japan | 7-036421 |
| Feb. 24, 1995 | [JP] | Japan | 7-036423 |
| Feb. 24, 1995 | [JP] | Japan | 7-036426 |

[51] Int. Cl.[7] .................................................. G03B 27/62

[52] U.S. Cl. ........................................... 355/75; 358/487

[58] Field of Search ..................... 355/75, 76; 358/506, 358/487, 488, 496, 474; 348/110, 96; 399/377–380; 396/316

[56] References Cited

U.S. PATENT DOCUMENTS

| 4,227,804 | 10/1980 | Pramstraller | 355/67 |
| 4,268,144 | 5/1981 | Wheeler | 354/108 |
| 4,433,910 | 2/1984 | Tarsia | 355/76 |
| 4,506,300 | 3/1985 | Fearnside | 358/225 |
| 4,924,258 | 5/1990 | Tsutsui | 355/53 |
| 4,980,781 | 12/1990 | Yamamoto et al. | 358/474 |
| 5,012,353 | 4/1991 | Yoshino et al. | 358/401 |
| 5,095,330 | 3/1992 | Nishida et al. | 355/75 |
| 5,128,714 | 7/1992 | Kishino . | |
| 5,301,043 | 4/1994 | Ichikawa | 358/498 |
| 5,335,093 | 8/1994 | Imoto | 358/487 |
| 5,621,502 | 4/1997 | Bronaugh et al. | 355/79 |
| 5,847,813 | 12/1998 | Hirayanagi | 355/75 |

Primary Examiner—Russell Adams
Assistant Examiner—Christopher Mahoney
Attorney, Agent, or Firm—Oliff & Berridge, PLC

[57] ABSTRACT

An image input apparatus includes an original holder for holding an original, and a reading device for optically reading an image on the original held by the original holder. The original holder has an original holding member for fixedly holding the original, and a frame member for rotatably holding the original holding member.

12 Claims, 11 Drawing Sheets

IMAGE INPUT APPARATUS

BACKGROUND OF THE INVENTION

1. Field of the Invention

The present invention relates to an image input apparatus for reading an image on a film or other original.

2. Description of the Related Art

Scanners are known as a kind of the image input apparatus for reading an image on a film or other original.

The scanners are roughly classified into a first type in which an image reading portion is moved while an original is fixed, so that a two-dimensional image on the original is read by the moving reading portion, and a second type in which the original is moved while the image reading portion is fixed, so that a two-dimensional image on the original is read by the fixed reading portion.

In the first type in which the reading portion is movable, an original is mounted on a fixed original stage, which is called platen, for example, and image reading is effected with a cover placed on the original. Some images may require adjustment of the position or angle of the original. For instance, the adjustment is made to rectify an undesirable angle of inclination of the horizon appearing on a photograph as the original. In this case, the cover is opened so that the angle and position of the original can be adjusted, and is then closed again, to permit subsequent image reading.

In the second type in which the original is moved, the original is placed on a movable stage while being fixed by a cover, for example, so that the image reading is effected on the moving original. When the angle of the image is required to be adjusted, it is necessary to remove the cover or the like, and remount or replace the original on the stage. In the case where the stage incorporates an angle adjusting mechanism, the adjustment is effected in response to commands generated by a computer, for example.

In the image input apparatus constructed as described above, it takes a lot of time to open the cover and reset the original again so as to adjust the angle of the image to be read. In addition, the accuracy of the adjustment is unsatisfactory, requiring trial-and-error, and thus the adjustment must be repeated many times. Where the angle adjusting mechanism is incorporated in the stage itself, the image input apparatus becomes undesirably large-sized and expensive, for example.

The originals used with the scanner are roughly classified into reflection-type originals, such as photographic prints or photoprints, and transparency-type originals, such as films. Although the front and rear of the reflection-type originals can be easily discriminated, it is not always easy to discriminate between the front and rear of the transparency-type originals. The front-rear discrimination has been conventionally made by reference to characters outside picture areas in the case of 35 mm films, and to the position of notches formed in film peripheral portions in the case of 4×5 size films.

In many cases, however, the film is set in a holder or the portion of the film outside its picture area is covered with a mask when the image is read by the scanner, and the characters and notches outside the picture area are hidden, thus making it difficult to discriminate between the front and rear of the film. As a result, the front and rear of the film may be reversed by mistake when an original holder for the film is set in the image input apparatus. If the original is set in the wrong way, it takes several minutes to read the image, which is time-consuming, and then the image reading must be tried again, resulting in reduced work efficiency.

The transparency-type originals include those held by mounts for slides. While these slide originals are read by a known image input apparatus for slides, called a slide scanner, this apparatus requires setting of the original and image reading for each image on the original. When multiple slide images are to be read at the same time, each original needs to be removed from the mount, and is set on a drum scanner, for example, so as to effect the image reading.

When the above-indicated slide scanner is used to read the images on the multiple slide originals, it takes a lot of time and effort to reset or replace the slide for each image, and the productivity is thus limited. On the other hand, the use of the drum scanner requires cumbersome and time-consuming procedures, such as removing each original from the mount, and attaching the original to the drum.

SUMMARY OF THE INVENTION

It is therefore an object of the present invention to provide an image input apparatus which is small-sized and available at a low cost, assuring improved work efficiency in adjusting the angle of an image on an original, which apparatus can avoid wrong insertion of an original holder so as not to reduce productivity, and can also read a plurality of slide originals with high efficiency.

The above object may be accomplished according to one aspect of the present invention, which provides an image input apparatus comprising an original holder for holding an original, and a reading device for optically reading an image on the original held by the original holder, wherein the original holder comprises an original holding member for fixedly holding the original, and a frame member rotatably supporting the original holding member.

The same object may be accomplished according to another aspect of the present invention, which provides an image input apparatus comprising an original holder for holding an original, an original stage on which the original holder is detachably installed, and a reading device for optically reading an image on the original set on the original stage, wherein the original holder has a particular shape, and the original stage has an engaging portion which matches the particular shape of the original holder only when the original holder is installed while being oriented in a predetermined direction.

The same object may be accomplished according to a further aspect of the present invention, which provides an image input apparatus comprising an original holder for holding at least one original, and a reading device for optically reading an image on each original held by the original holder, wherein the original holder includes an original holding member capable of holding a plurality of originals which are held by respective mounts.

DESCRIPTION OF THE PREFERRED EMBODIMENTS

First Embodiment

Referring to FIG. 1 through FIG. 6, there will be described the first embodiment of the image input apparatus of the present invention.

Figure 4:
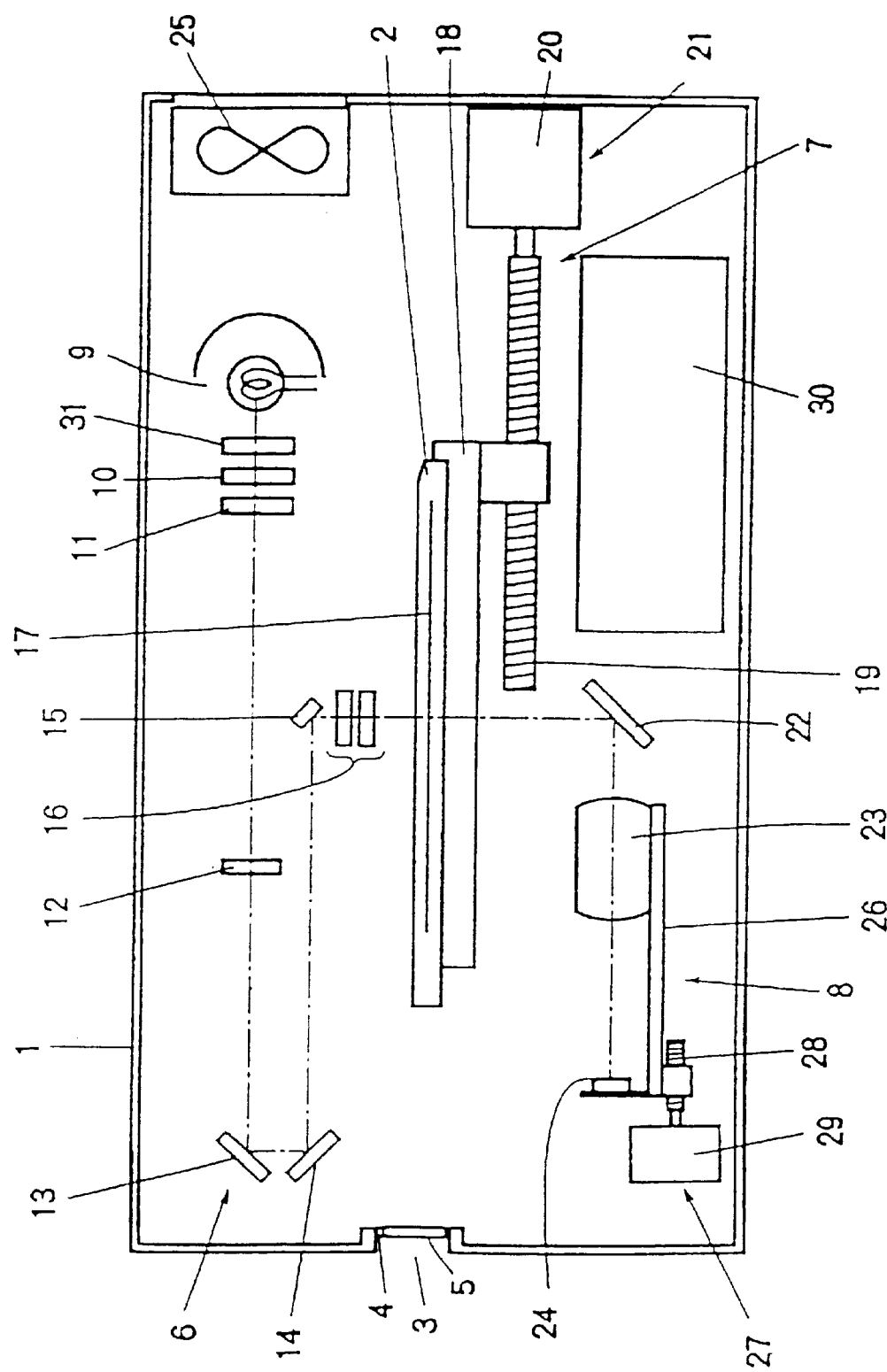
FIG. 4 is a vertical cross sectional view schematically showing the interior construction of the image input apparatus of the first embodiment.
Figure 5:
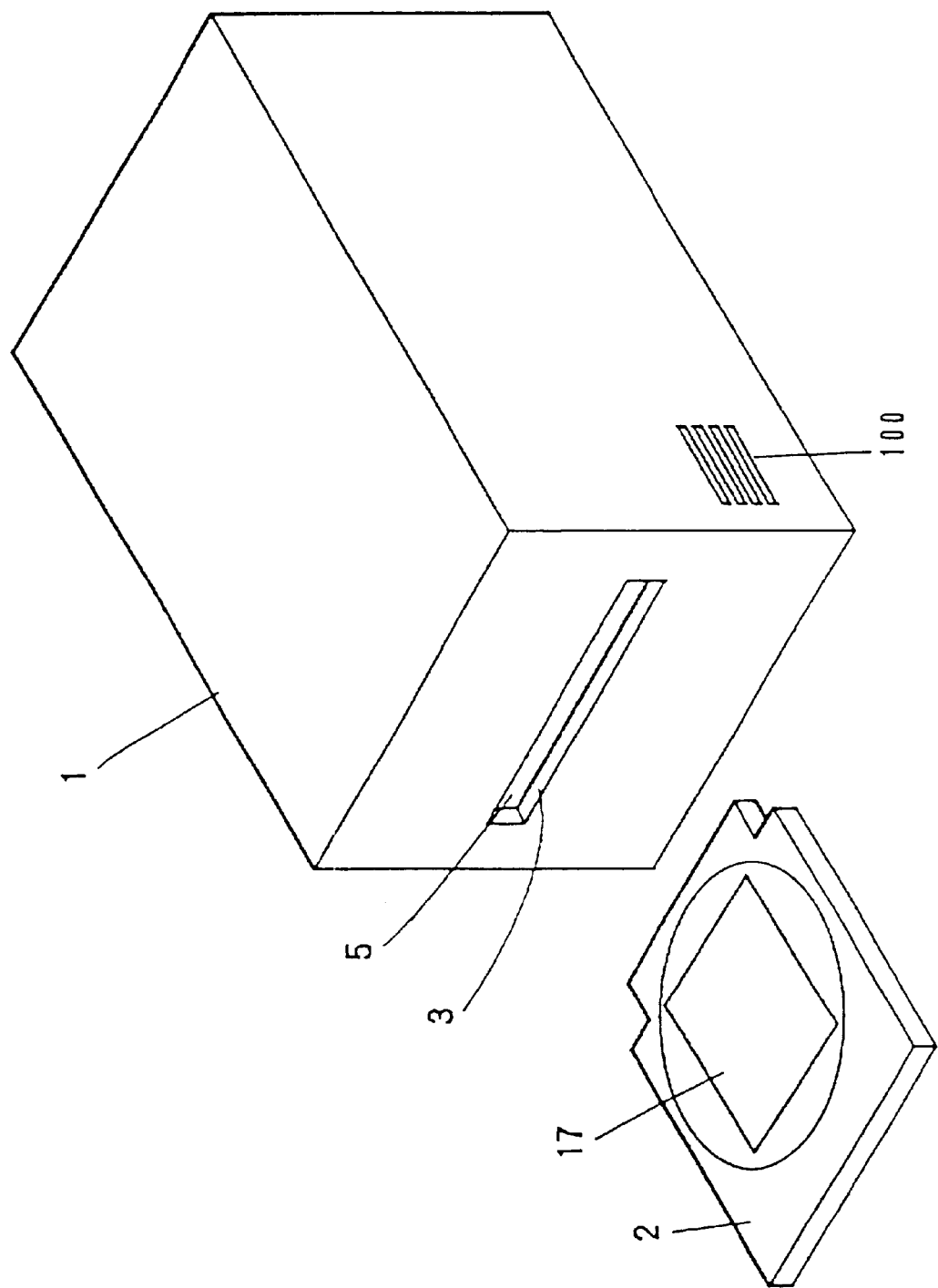
FIG. 5 is a perspective view showing the appearance of the image input apparatus of the first embodiment.

FIG. 5 shows the appearance of the image input apparatus according to the first embodiment of the present invention, in which a case 1 is formed in the shape of a box. Referring to FIG. 4 schematically showing the interior construction of the image input apparatus, the case 1 has an inlet slot 3 formed through the front thereof, which slot allows a film holder 2 to be inserted into and taken out of the case 1. The inlet slot 3 is provided with a door 5 that is pivotable about a shaft 4. The interior of the case 1 substantially consists of three layers, namely, an illuminating portion 6, an original scanning portion 7, and an image forming portion 8, which are arranged in this order from top to bottom as viewed in FIG. 4.

The illuminating portion 6 includes a light source 9, such as a halogen lamp, which is disposed on the right-hand side of FIG. 4, a heat absorbing filter 31, a diffusing plate 10, a color filter 11, a first condenser lens 12, a first mirror 13, a second mirror 14, a third mirror 15, and second condenser lenses 16. The light emitted by the light source 9 impinges upon the first, second and third mirrors 13, 14, 15, such that its optical path is bent by each mirror at right angles. The light reflected by the third mirror 15 is incident upon a film 17 in a direction perpendicular to the plane of the film. Since the optical path is folded, and extends substantially in parallel with the plane of the film 17, the illuminating portion 6 is constructed with a relatively small thickness.

The original scanning portion 7 includes a film holder 2, a stage 18, and a drive mechanism 21 having a lead screw 19 and a stage motor 20. The lead screw 19 and the stage 18 are disposed in parallel with the optical path formed by the illuminating portion 6.

The image forming portion 8 includes a mirror 22, a lens 23 and a CCD 24, which are disposed such that the optical path reflected by the mirror 22 extends in parallel with the horizontal optical path of the illuminating portion 6. Since an image on the film 17 is read by the linear CCD 24, the film 17 can have a linear illuminated region corresponding to the CCD 24, thus permitting the use of linear Fresnel condenser lenses 12, 16, and linear mirrors 13, 14, 15 in the illuminating portion 6. This allows the optical path of the illuminating optical system to be folded or made compact in the thickness direction, as described above, whereby the thickness of the illuminating portion 6 can be reduced.

A vent (100 in FIG. 5) for air is formed through a left, lower portion of the case 1 as seen in FIG. 4, which portion is faced to the CCD 24. Exhaust fan 25 is provided at the right, upper portion of the case 1 as seen in FIG. 4.

There will be described an image reading operation, and insertion and ejection of the film holder 2. When the film holder 2 is not inserted in the case 1, the stage 18 of the image input apparatus is in a standby position in which the stage 18 is ready to receive the film holder 2. The stage 18 is moved to the left from the position shown in FIG. 4 to the standby position.

After the film 17 is set in the film holder 2, the film holder 2 is inserted through the inlet slot 3, and fixed on the stage 18. The door 5 attached to the inlet slot 3 is pivoted counterclockwise as viewed in FIG. 4, in accordance with the insertion movement of the film holder 2 (which is moved rightward in FIG. 4). Upon completion of loading of the film holder 2, the stage 18 is moved to a position where the image reading is started, and the door 5 is closed. While an arrangement for closing the door 5 is not shown in the figures, the door 5 can be closed by utilizing the gravity, or any suitable force, such as coil spring, torsion coil spring, sheet spring, or electromagnetic force produced by solenoid, motor or the like.

The stage 18 is driven by the drive mechanism 21, and moved to the right, so that auxiliary scanning for reading the image on the film 17 is effected. In the illuminating portion 6, the light source 9 is turned on, and a local portion of the film 17 to be read is irradiated with the light emitted by the light source 9. The light transmitted through the image on the film 17 is incident on the CCD 24, through the mirror 22 and lens 23, so as to form an image on the CCD 24. Thus, reading of the image corresponding to one line is accomplished. This reading operation is repeatedly effected in the main scanning direction while the film 17 is moved in the auxiliary scanning direction perpendicular to the main scanning direction, whereby the two-dimensional image on the film 17 can be read or inputted.

The CCD 24 reads the image on the film 17 in the above manner, and performs photoelectric conversion, so as to generate image signals to be received by an image processing portion (not shown). The color filter 11 has red, blue and green filters, through which the light incident on the same image is alternately transmitted, so that a color image can be read or inputted.

The lens 23 and the CCD 24 as a linear image sensor are fixedly mounted on a support member 26 for the image forming portion, such that the lens 23 is spaced a given distance from the CCD 24. The support member 26 is driven by a focusing drive mechanism 27. The focusing drive mechanism 27 includes a lead screw 28 used for driving the support member 26, a focusing motor 29 for rotating the screw 28, and a guide bar (not shown) which guides the lens 23 and the CCD 24 in the direction of the optical axis, and a guide member (not shown).

The image processing portion (not shown) performs input processing of images, and other processing, such as an automatic focusing operation wherein the contrast of the image is calculated each time the focusing drive mechanism 27 is driven.

During operation of the above-described image input apparatus, heat is generated due to driving of the stage motor 20, lighting by the light source 9, and a power supply 30 for exciting circuits. With the vent 100 (FIG. 5) formed near the CCD 24 in the lower portion of the case 1, the outside air is introduced through this vent 100, to absorb the heat generated by the stage motor 20, light source 9 and power supply 30 in the case 1, and then discharged out of the case 1 by means of the exhaust fan 25. Thus, the temperature rise around the CCD 24 can be avoided.

The ejection of the film holder 2 is achieved by leftward movement of the stage 18. As the stage 18 is moved leftward until it reaches its standby position, the rear end of the film holder 2 pushes and pivots the door 5 about the shaft 4, so that the film holder 2 is released from the stage 18 and moved in the direction in which the holder 2 is ejected. The rear end of the film holder 2 exposed outside of the inlet slot 3 makes it possible to take the film holder 2 out of the case 1. Once the film holder 2 is pulled out, the door 5 is closed due to the gravity, for example.

Figure 1:
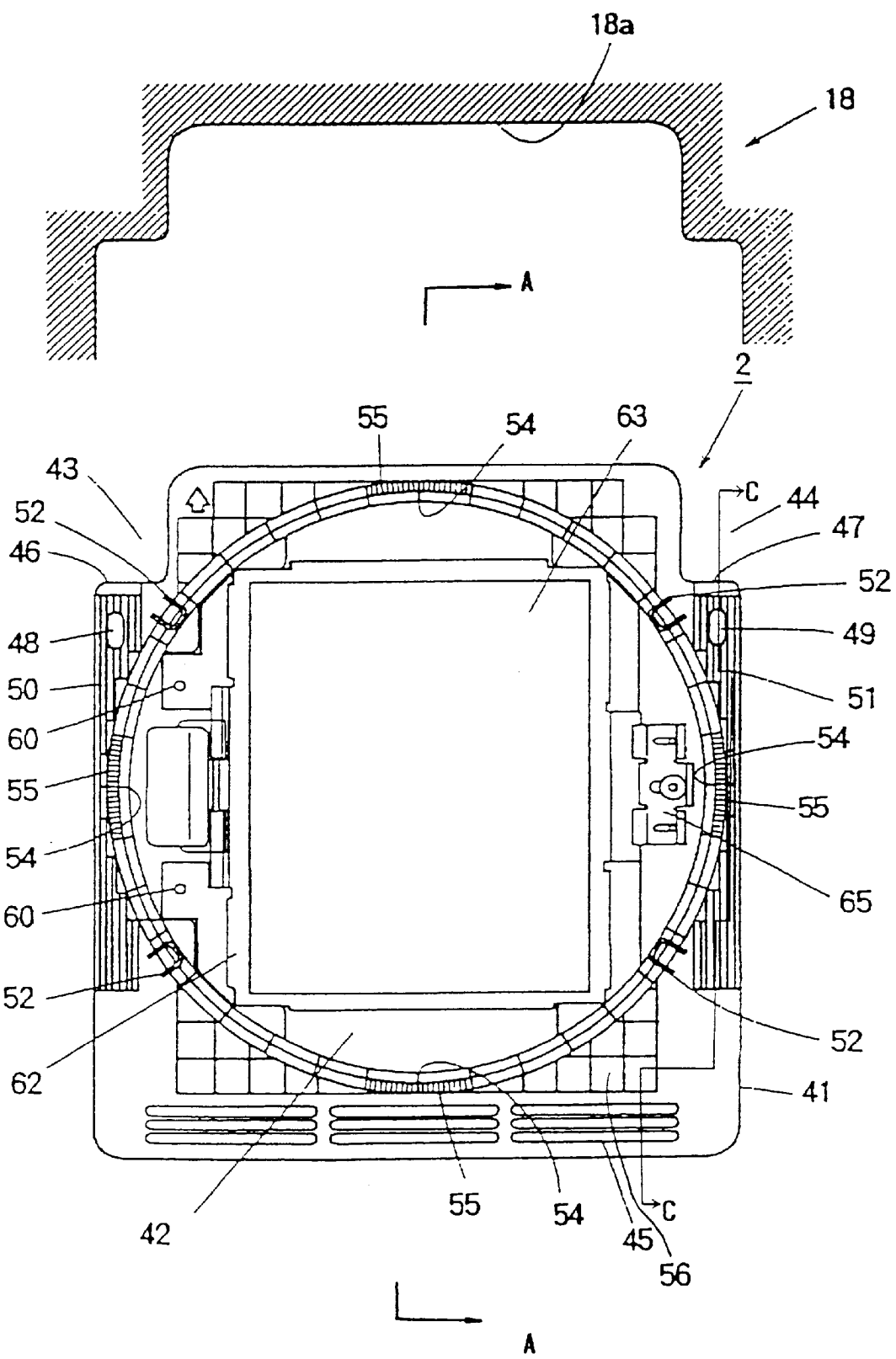
FIG. 1 is a plan view showing the construction of a film holder according to the first embodiment of the image input apparatus of the present invention.

The film holder 2 will be hereinafter described in detail. Referring to FIG. 1, the film holder 2 consists of a frame 41 that provides the profile or configuration of the holder 2, and a turntable 42 that is rotatably supported in the middle of the frame 41. The film holder 2 takes the form of a generally rectangular thin plate, which has left and right notches 43, 44 formed in the front end portion thereof (on the upper side of FIG. 1) as viewed in the direction of insertion of the holder 2. The left and right notches 43, 44 have unsymmetrical shapes. In the present embodiment, the left notch 43 has a larger area than the right notch 44.

Figure 2:
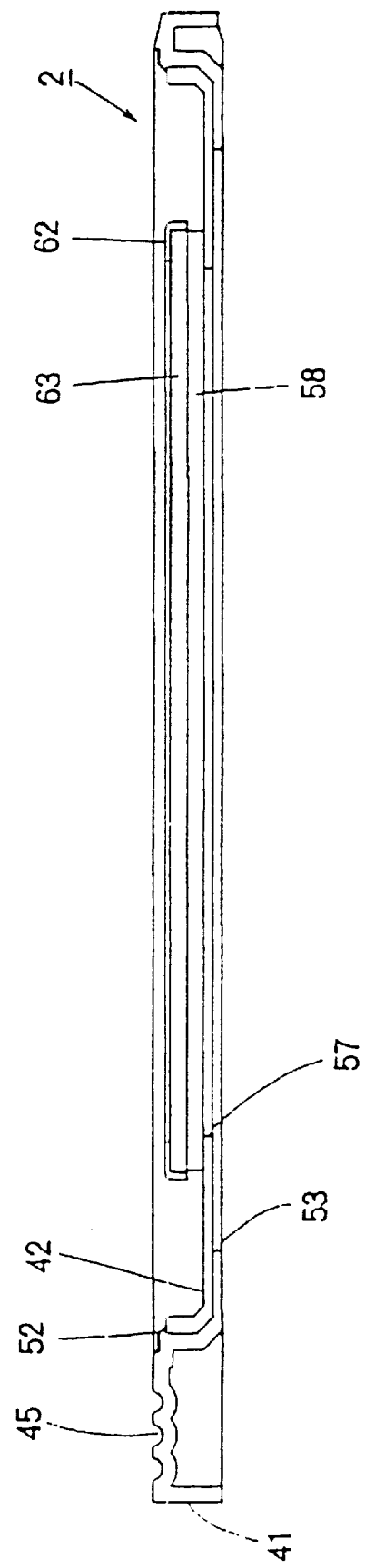
FIG. 2 is a cross sectional view of the film holder of the first embodiment, which is taken along line A—A of FIG. 1.

The frame 41 has grooves 45 formed in its rear end portion (on the lower side of FIG. 1) as viewed in the direction of insertion of the film holder 2. The grooves 45 facilitate the insertion and ejection of the film holder 2. On the left and right sides of the frame 41 in the direction of insertion, there are formed slant faces 46, 47 adjoined by the notches 43, 44, positioning holes 48, 49, and sliding portions 50, 51 in the form of projections. A plurality of claws 52 are formed around the turntable 42 disposed in the middle of the frame 41, and the turntable 42 is rotatably supported on the frame 41. The claws 52 function to prevent the turntable 41 from being detached from the frame 2 when the film holder 2 is turned upside down. As shown in FIG. 2, an opening 53 is formed through a portion of the frame 41 below the turntable 42.

Angular indices 54 are formed on the outer periphery of the turntable 42 such that adjacent ones of the indices 54 are spaced 10 degrees from each other. On the other hand, angular scales 55 are formed on the inner periphery of the frame 41. The frame 41 also has grid scales 56 formed around the turntable 42, and sliding portions 50, 51 formed in steps on the left and right sides of the turntable 42. These sliding portions 50, 51 are graduated according to the grid scales 56.

Figure 3:
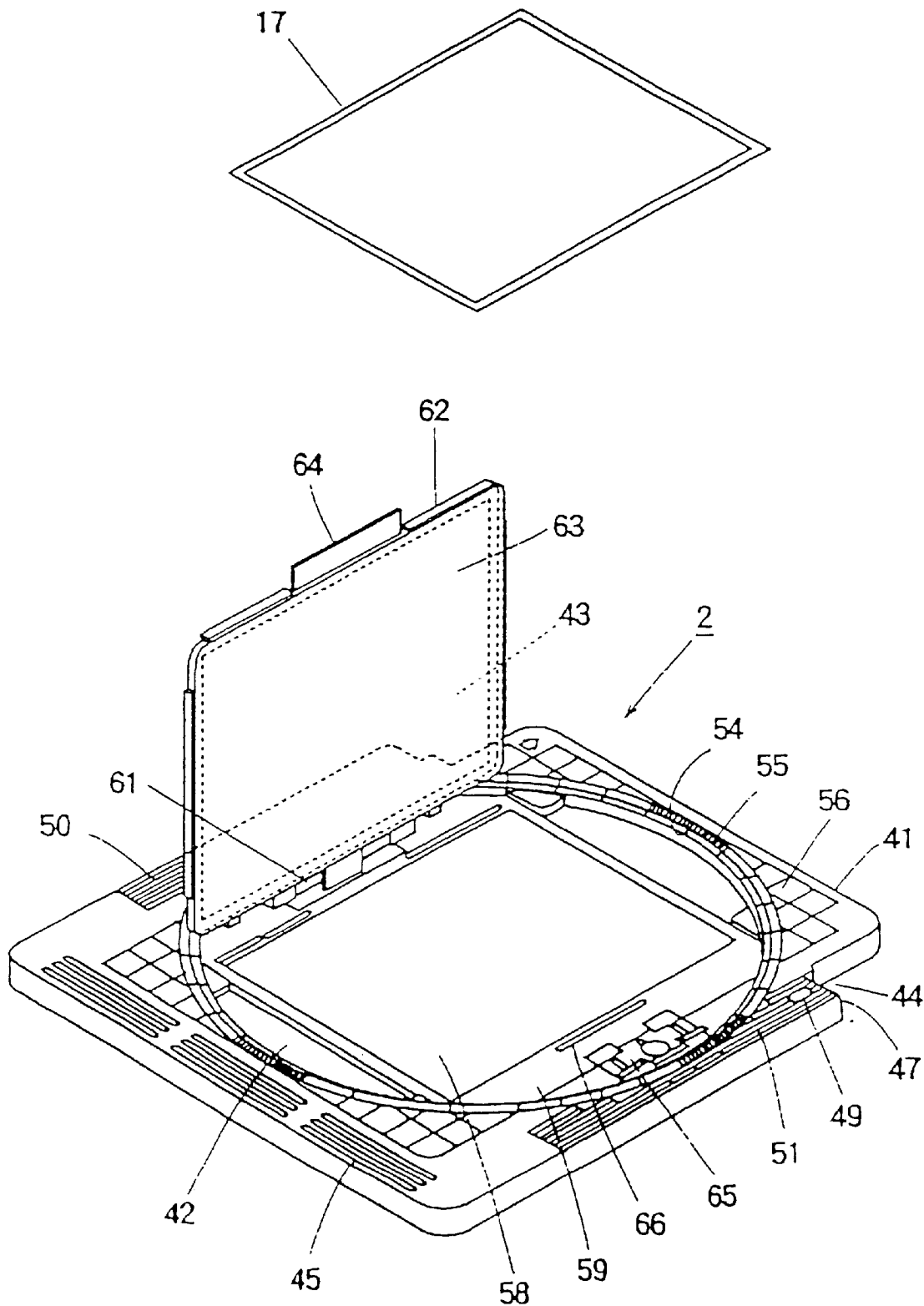
FIG. 3 is a perspective view explaining the usage of the film holder of the first embodiment.

The turntable 42 has an opening 57 formed through a bottom wall thereof, as shown in FIG. 2. Glass plate 58 is fixed on the upper side of the opening 57, and mask 59 that fits the size of the film 17 is mounted on the glass plate 58, as shown in FIG. 3. The mask 59 is positioned by pins 60 as shown in FIG. 1, and may be replaced by another mask, depending upon the size of the film 17. At one end of the turntable 42, a glass plate 63 is supported by a hinge 61 and a frame member 62, as shown in FIG. 3, such that the glass plate 63 is freely opened and closed. At the other end of the turntable 42, there is provided a latch 65 adapted to lock a distal portion 64 of the frame member 62 for the glass plate 63.

To load the film holder 2 with the film 17, the distal portion 64 of the frame member 62 of the glass plate 63 is initially released by shifting the latch 65 of the film holder 2, as shown in FIG. 3. The mask 59 on the glass plate 58 may be replaced by one that fits the size of the film 17, and the film 17 is placed with reference to a positioning portion 66 provided on the mask 59. The frame member 62 formed as a unit with the glass plate 63 is then closed, and fixed or locked by the latch 65. The film 17 is interposed between and supported by the two glass plates 58, 63 on the mask 59, and the flatness of the film 17 is thus maintained. The film 17, which is a transparency-type original interposed between the glass plates 58, 63, can be observed through the frame member 62 and the openings 53, 57, and the image on the film 17 can be read by a scanner as the image input apparatus.

The mask 59 serves to reduce an influence of the light transmitted through a portion of the film 17 which bears no image, so as to obtain favorable image data that is free from fogging. When the mask 59 is not used, the position and angle of the film 17 may be determined by reference to the grid scales 56 and the angular scales 55 of the frame 41, though the positioning portion 66 cannot be utilized.

The image read by the image input apparatus can be confirmed on a monitor through a computer or the like, and a degree of deviation of the image from a predetermined or intended angle can be calculated. Once the degree of deviation from the predetermined angle is calculated, the film holder 2 is ejected from the image input apparatus. On the film holder 2 thus ejected, the turntable 42 is manually rotated based on the obtained deviation angle, referring to the angular indices 54 and the angular scales 55, so that the orientation of the image can be adjusted. When the film holder 42 is inserted again into the image input apparatus and the image reading operation is performed, the obtained data represents the image oriented at the predetermined or intended angle.

If the film 17 has an image of the horizon on the sea, for example, the horizon can be inclined as desired by placing the film holder 2 ejected from the image input apparatus on a light table, for example, and manually rotating the turntable 42 with reference to the grid scales 56. In the present embodiment, the inclination of the image can be easily adjusted since the adjustment can be also made while the user looks at the original that bears the image.

Figure 6:
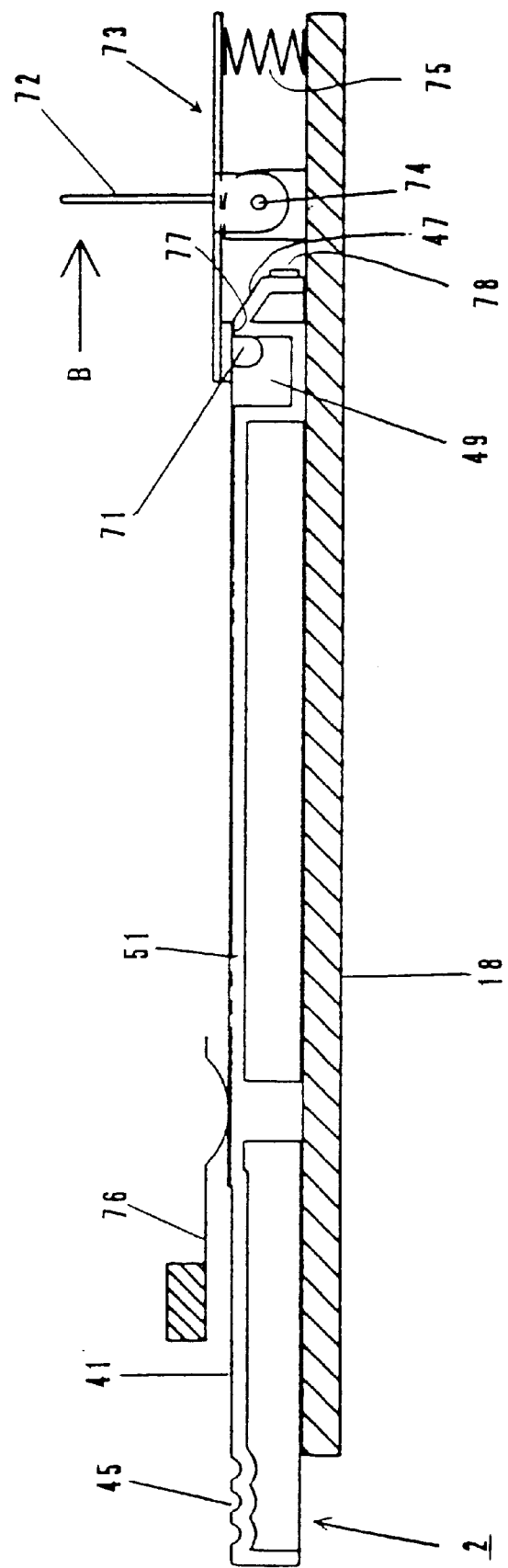
FIG. 6 is a cross sectional view of the film holder of the first embodiment when it is placed on a stage, which is taken along line C—C of FIG. 1.

There will be next described the manner of positioning and retaining the film holder 2 on the stage 18 of the image input apparatus. FIG. 6 is a cross sectional view showing the film holder 2 placed on the stage 18, which is taken along line C—C of FIG. 1. On each of the left and right side of the rear portion of the stage 18 (on the right-hand side of FIG. 6), a seesaw member 73, which has a shaft portion 71 at its distal end and an arm portion 72 at its middle upper portion, is biased counterclockwise by a spring 75, about a rotary shaft 74. A downwardly biased sheet spring 76 is provided on each of the left and right side of the front portion of the stage 18 (on the left-hand side of FIG. 6).

When the film holder 2 is manually inserted with respect to the stage 18 placed in the standby position, the sliding portion 51 is initially biased by the sheet spring 76. After the slant face 47 brings up the shaft portion 71 and further proceeds, the shaft portion 71 falls into the positioning hole 49. In the meantime, the film holder 2 receives force from a return member 78, in the direction (leftward in FIG. 6) opposite to the direction in which the film holder 2 is inserted. With the returning force acting on the film holder 2, the shaft 71, stepped portion 77 and the positioning hole 49 cooperate with each other to determine the position of the film holder 2 upon release of a hand therefrom, whereby the film holder 2 is locked in position on the stage 18.

The space 18a on the rear side of the stage 18 has an unsymmetrical shape in the lateral direction, so as to conform to the unsymmetrical shape of the film holder 2, as shown in FIG. 1. If the film holder 2 is inadvertently flipped over and inserted in the wrong direction, therefore, the film holder 2 does not reach the innermost or rear end of the stage 18, and is thus prevented from being locked on the stage 18. Thus, the film holder 2 is keyed to fit into the stage 18 in only one direction.

Further, the film holder 2 is designed such that the dimension of the holder 2 as measured in the direction (the lateral direction of FIG. 1) perpendicular to the inserting direction is smaller than that as measured in the direction of its insertion (the vertical direction of FIG. 1). Since the width of the inlet slot 3 of the image input apparatus is determined so as to correspond to the short side of the film holder 2, as shown in FIG. 5, it is impossible to insert the film holder 2 which is oriented in a direction perpendicular to the nominal direction.

In the present embodiment, the sheet spring 76 retains the rear end portion of the sliding portion 51 of the film holder 2, and the stepped portion 77 of the seesaw member 73 retains the front end portion of the sliding portion 51. The upper and lower surfaces of these retained portions of the film holder 2 are elevated or protruded from the other portions of the holder 2, and therefore the vertical position of the holder 2 is determined by accurately dimensioned rails on the bottom surface of the stage 18. Consequently, the film 17 can be positioned precisely in parallel with the stage 18.

There will be next described the manner of releasing and ejecting the film holder 2 from the stage 18 of the image input apparatus. When the stage 18 is moved from the insertion standby position in the direction in which the film holder 2 is ejected (to the left in FIG. 6), the arm portion 72 of the seesaw member 73 is driven or pushed by a fixed member (not shown), in the direction of an arrow B as indicated in FIG. 6, whereby the seesaw member 73 is tilted clockwise against the biasing force of the spring 75. In this condition, the shaft portion 71 is disengaged from the hole 49, and the film holder 2 is pushed back by the return member 78, so that the rear end of the holder 2 can be pulled out of the inlet slot 3.

According to the first embodiment, the film 17 as the original can be easily rotated, as described above. Further, the image data read by the image input apparatus can be confirmed on the monitor, and a required or desired rotating angle of the image can be calculated with high accuracy. Moreover, the image input apparatus does not require a rotating mechanism for the stage, thus assuring reduced size and lowered cost of the apparatus.

Moreover, since the notches on the front end portion of the film holder 2 are formed unsymmetrically, it can be prevented that the film holder 2, that is an original, is inadvertently flipped over and inserted in the wrong direction.

Second Embodiment

Figure 7:
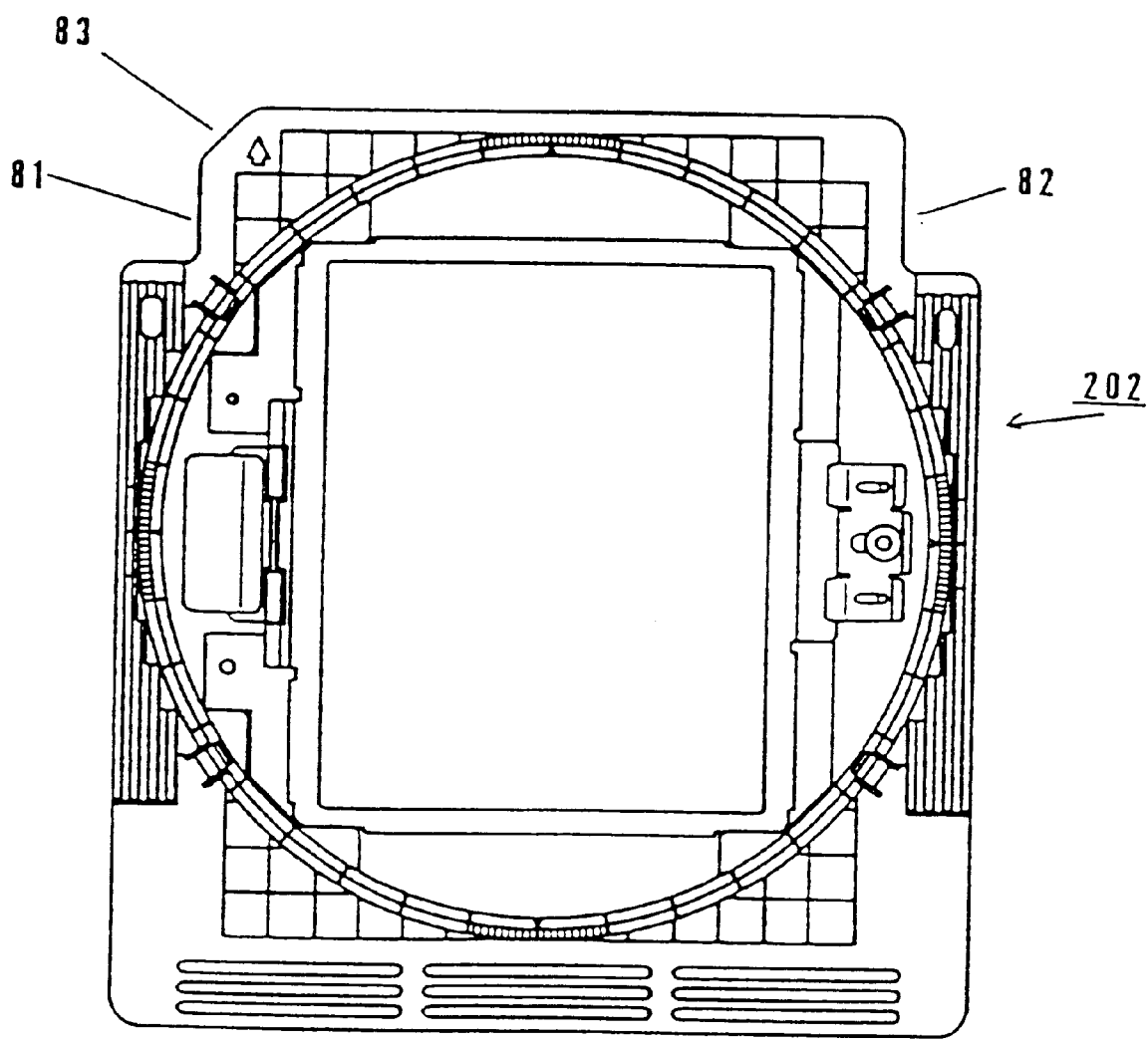
FIG. 7 is a plan view showing the construction of a film holder used in the second embodiment of the image input apparatus of the present invention.

FIG. 7 is a plan view showing a film holder 202 constructed according to the second embodiment of the present invention. The film holder 202 takes the form of a generally rectangular, thin plate, which has left and right notches 81, 82 formed in the front end portion thereof (on the upper side of FIG. 7) as viewed in the direction of insertion of the holder 2. Chamfered portion 83 is formed at the front end of the film holder 2 on the side of the left notch 81, so as to render the holder 2 unsymmetrical with respect to its center line extending in the direction of insertion thereof. The stage 18 of the image input apparatus is provided with a protrusion or the like, which faces and engages the chamfered portion 83. The rest of the structure of the second embodiment is the same as that of the first embodiment.

Third Embodiment

Figure 8:
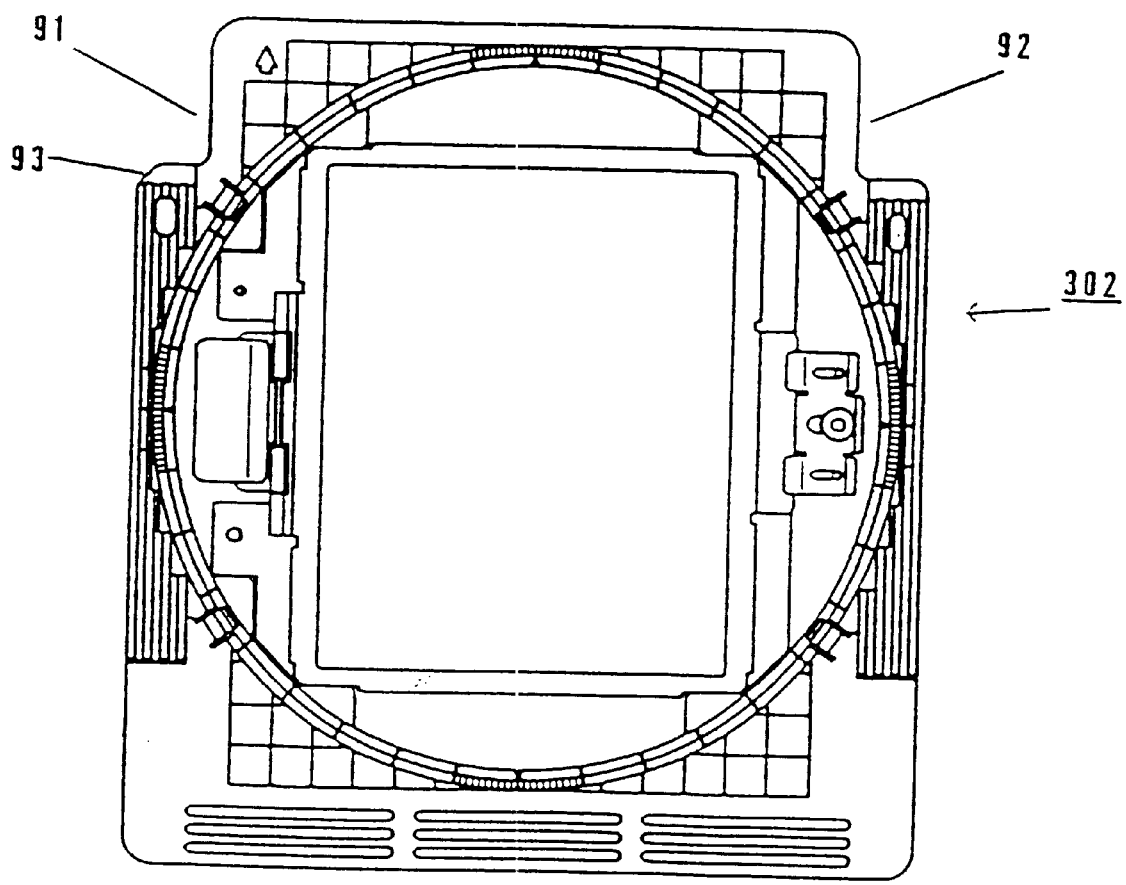
FIG. 8 is a plan view showing the construction of a film holder used in the third embodiment of the image input apparatus of the present invention.

FIG. 8 is a plan view showing a film holder 302 constructed according to the third embodiment of the present invention. The film holder 302 takes the form of a generally rectangular thin plate, which has left and right notches 91, 92 formed in the front end portion thereof (on the upper side of FIG. 9) as viewed in the direction of the insertion of the holder 2. The rear end corner of the left notch 91 is chamfered, to form a chamfered corner 93, which renders the film holder 302 unsymmetrical with respect to its center line extending in the direction of insertion thereof. The rest of the structure of the third embodiment is the same as that of the first embodiment.

Fourth Embodiment

Figure 9:
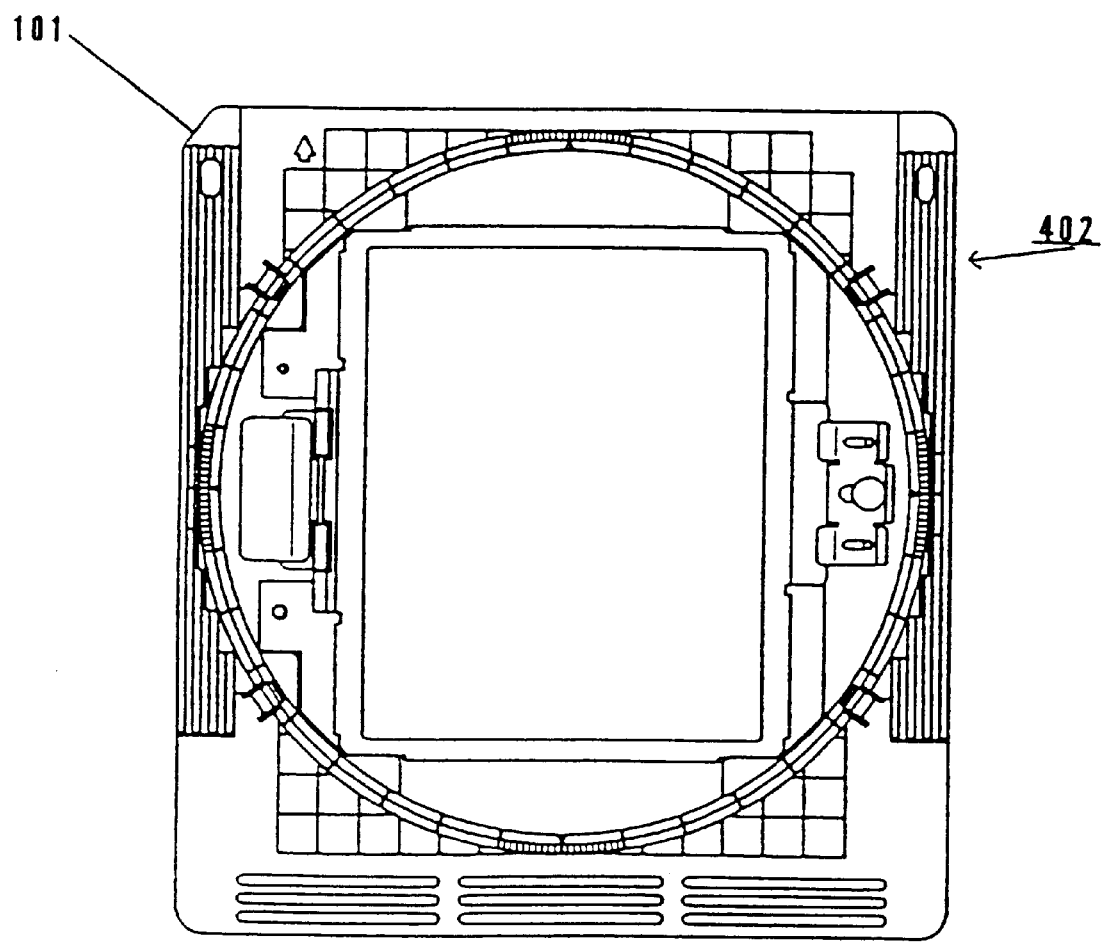
FIG. 9 is a plan view showing the construction of a film holder used in the fourth embodiment of the image input apparatus of the present invention.

FIG. 9 is a plan view showing a film holder 402 constructed according to the fourth embodiment of the present invention. The film holder 402 takes the form of a generally rectangular thin plate. The left corner of the leading portion of the film holder 402 as seen in the inserting direction is chamfered, to provide a chamfered corner 101, which renders the holder 402 unsymmetrical with respect to its center line extending in the direction of insertion thereof. The stage of the image input apparatus is provided with a protrusion or the like, which faces and engages the chamfered corner 101. The rest of the structure of the fourth embodiment is the same as that of the first embodiment.

Fifth Embodiment

Figure 10:
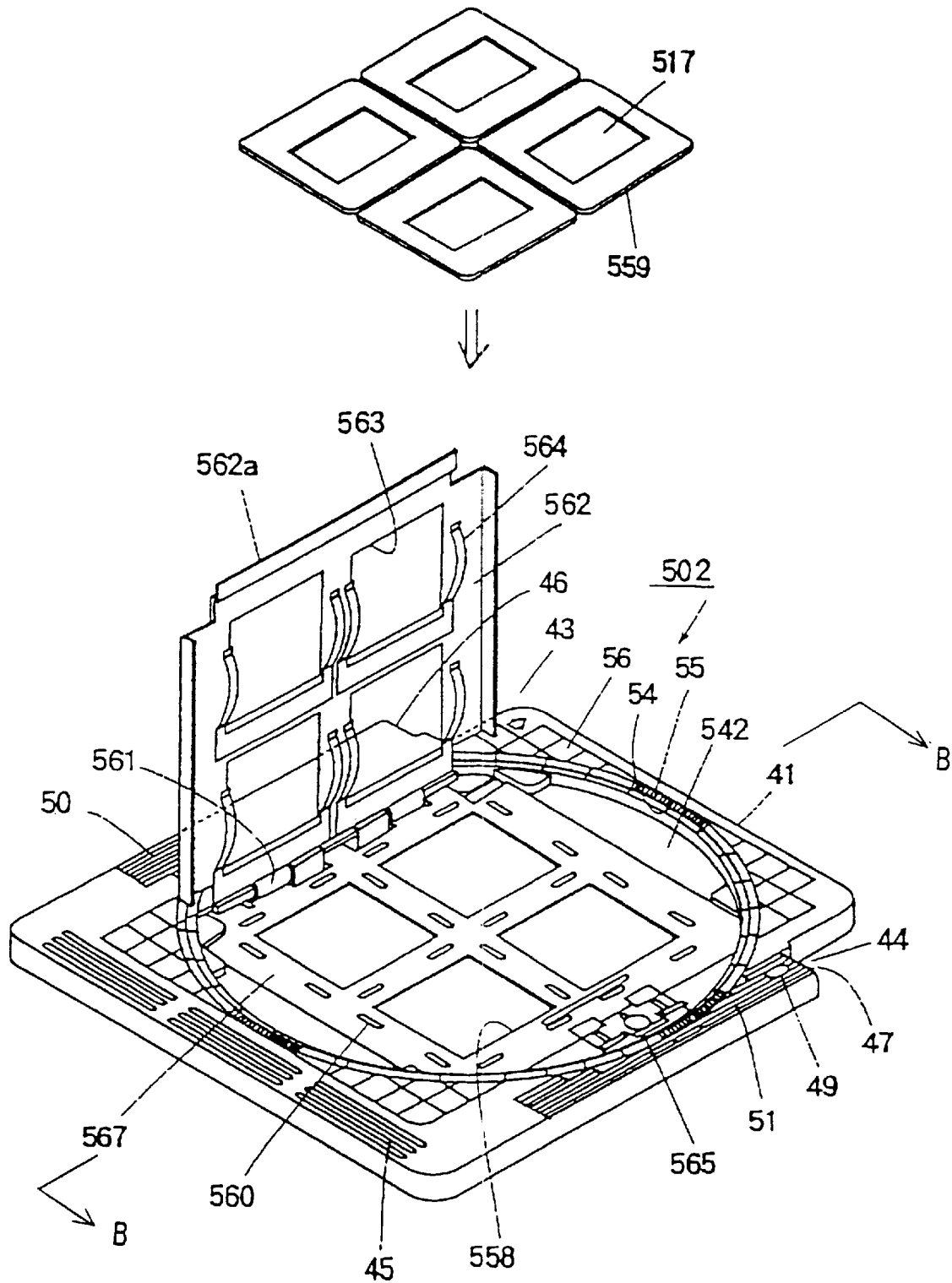
FIG. 10 is a perspective view explaining the usage of a film holder in the fifth embodiment of the image input apparatus of the present invention.
Figure 11:
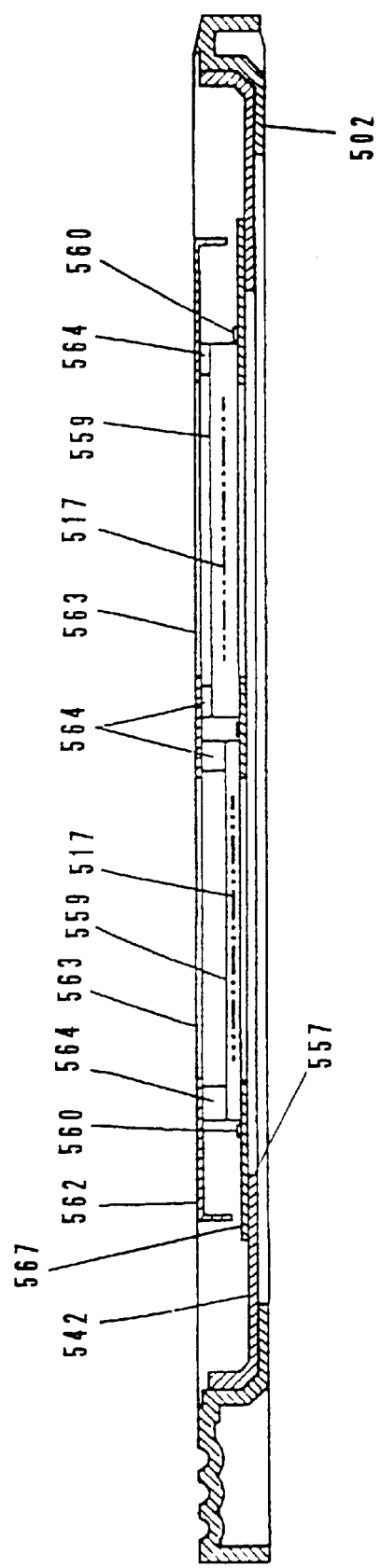
FIG. 11 is a cross sectional showing the film holder of the fifth embodiment, which is taken along line B—B of FIG. 10.

FIG. 10 is a perspective view showing a film holder 502 constructed according to the fifth embodiment of the present invention. FIG. 11 is a cross sectional view of the film holder 502, taken along line B—B of FIG. 10. In these figures, the same reference numerals as used for the film holder 2 of the first embodiment of FIGS. 1 through 3 are used to identify structurally and/or functionally corresponding elements, which will not be explained in the following description. Further, the structure of the fifth embodiment other than the film holder 502 is identical with that of the first embodiment, and therefore will not be described.

In FIG. 11, an opening 557 is formed through a bottom wall of the turntable 542, and a mount positioning plate 567 is fixed on the upper surface of the bottom wall of the turntable 542, as shown in FIG. 10. The mount positioning plate 567 is formed with a plurality of openings 558, around which are provided a plurality of protrusions 560 adapted to regulate or determine the position of film mounts 559.

At one end of the turntable 542, a mount holding plate 562 is supported through a hinge 561, such that the plate 562 is freely opened and closed. The mount holding plate 562 is formed with a plurality of openings 563 corresponding the openings 558 of the mount positioning plate 567. Sheet springs 564 are provided around the openings 563, such that one end of each spring 564 is fixed to the holding plate 562. At the other end of the turntable 542, there is provided a latch 565 adapted for locking a distal end portion 562a of the mount holding plate 562.

To load the film holder 502 with the film mounts 559 holding films 517 therein, the latch 565 of the film holder 502 is shifted to release the distal portion 562a of the mount holding plate 562. After the film mounts 559 are installed in place on the mount positioning plate 567 while being guided by the protrusions 560, the mount holding plate 562 is closed, and locked by the latch 565. At this time, frame portions of the film mounts 559 are retained by the sheet springs 564 on the mount positioning plate 567, assuring desired flatness of the film mounts 559. The films 517 as transparency-type originals may be observed within the openings 558, 563, making it possible for a scanner as the image input apparatus to read the images on the films 517.

Since the plurality of film mounts 559 are retained independently of each other, with the sheet springs 564 provided around the respective openings 563, the film holder 502 may be loaded with film mounts 559 having different thicknesses at the same time.

In the image input apparatus, the image reading is effected by a host computer, for example, in the same manner as in the first embodiment. In this reading operation, a wide range of images may be initially read by previewing, for example, wherein images on four sheets of slide films are concurrently displayed on a monitor device. Thereafter, a local region having the image on each slide film is designated, and the focusing operation is effected with respect to the designated region, so as to obtain data representing the trimmed image. These steps of designating the region, focusing, and reading the trimmed image can be repeated for each of the films. If the film holder 502 is loaded with a plurality of film mounts 559, and inserted into the image input apparatus, therefore, a plurality of images can be sequentially read from the respective films, without ejecting the film holder 502 out of the image input apparatus, nor replacing the film mounts 559.

In the fifth embodiment as described above, a plurality of films 517 are placed in order on the film holder 502, and each of the films 517 is independently held under pressure by the corresponding sheet springs 564. In this arrangement, the images on the plurality of the films 517 can be read at the same time, without requiring replacement of the films 517, thus assuring improved efficiency. Further, the film mounts 559 holding the films 517 can be stably supported by the film holder 502 even if the film mounts 559 have different thicknesses. Moreover, the films 517 need not be mounted on or removed from the film holder 502, resulting in little possibility of damaging the films 517.

While the image input apparatus and film holder of the first through fifth embodiments are adapted to deal with films which are transparency-type originals, the present invention may be applied to the apparatus dealing with reflection-type originals. Further, the image input apparatus is not limited to that in which an original is moved relative to the image reading portion, but may be of a type in which an original holder is mounted on a fixed platen and an image reading portion is moved relative to the original.

While the film holder 2 is detachable from the image input apparatus in the illustrated embodiments, the structure of the turntable 42 rotatably supported by the frame 41 may be applied to the apparatus to which the film holder is fixed.

While the film holder is formed in the shapes as employed in the first through fourth embodiments, so as to prevent the holder from being installed while it is flipped over, the shape of the film holder is not limited to those of the illustrated embodiments. Rather, the film holder may be formed in any unsymmetrical shape which can avoid the above mistake upon installation of the holder.

Although the fifth embodiment includes four film mounts 559, the number of the film mounts 559 is not necessarily limited to four. Further, the protrusions 560 may be eliminated, and the film mounts 559 may be arranged in close contact with each other. In this case, the positions of the openings 558, 563 formed through the mount positioning plate 567 and the mount holding plate 562 may be changed.

What is claimed is:

1. An image input apparatus comprising:
an original holder for holding a plurality of originals one of the plurality of originals having a predetermined width; and
a reading device for optically reading an image on each of said plurality of originals held by said original holder, wherein said original holder includes an original holding member for holding said plurality of originals at the same time, said original holding member has at least one pressing member for pressing and fixing said plurality of originals independently of each other so that said plurality of originals are stuck to said original holder, said original holder includes a first positioning member and a second positioning member that determine a position of said one of said plurality of originals, said first positioning member and said second positioning member are arranged with a predetermined pitch, and said predetermined pitch is larger than the width of said one of said plurality of originals.

2. An image input apparatus according to claim 1, wherein said original holding member has at least one positioning member which determines respective positions of said plurality of originals.

3. An image input apparatus according to claim 1, wherein said original holder further includes a frame member for rotatably supporting said original holding member.

4. An image input apparatus according to claim 1, wherein said first positioning member and said second positioning member are fixed to said original holder.

5. An image input apparatus according to claim 1, wherein said original holding member includes a receiving member that receives said plurality of originals and a pressing plate that is hinged to said receiving member so as to be moveable between open and closed positions, said pressing plate including said at lest one pressing member.

6. An image input apparatus according to claim 1, further comprising a display control device that outputs a signal to an outside monitor device allowing images on said plurality of originals read by said reading device to be concurrently displayed on the outside monitor device.

7. An image input apparatus according to claim 1, further comprising:
a focusing device that performs a focusing operation on each of said plurality of originals; and
a reading control device that performs successive reading of said plurality of originals by driving said reading device after driving said focusing device for each of said plurality of originals.

8. An image input apparatus according to claim 1, further comprising:
a designating device that designates a local reading region corresponding to one of said plurality of originals; and
a reading control device that performs successive reading of said plurality of originals by driving said reading device after driving said designating device for each of said plurality of originals.

9. An image input apparatus according to claim 1, wherein said original holding member has a plurality of said pressing members, and each of said plurality of pressing members presses and fixes each of said plurality of said originals independently.

10. An original holder that holds a plurality of originals of a predetermined width and is detachably installed in an image input apparatus, comprising:
an original holding member for holding the plurality of originals at the same time, the original holding member including at least one pressing member that presses and fixes said plurality of originals independently of each other onto said original holder, the original holding member further including a first positioning member and a second positioning member that determine a position of one of said plurality of originals, wherein said first positioning member and said second positioning member are arranged with a predetermined pitch, and said predetermined pitch is larger than the width of said one of said plurality of originals.

11. An original holder according to claim 10, wherein said original holding member has at least one positioning member that determines respective positions of said plurality of originals.

12. An original holder according to claim 10, wherein said first positioning member and said second positioning member are fixed to said original holder.

* * * * *